(12) United States Patent
Srinivasan et al.

(10) Patent No.: US 7,751,482 B1
(45) Date of Patent: Jul. 6, 2010

(54) PHASE CORRELATION BASED MOTION ESTIMATION IN HYBRID VIDEO COMPRESSION

(75) Inventors: Deepika Srinivasan, Amherst, NY (US); Andew T. Krupiczka, Middletown, CT (US); Sassan Pejhan, Princeton, NJ (US)

(73) Assignee: VBrick Systems, Inc., Wallingford, CT (US)

( * ) Notice: Subject to any disclaimer, the term of this patent is extended or adjusted under 35 U.S.C. 154(b) by 993 days.

(21) Appl. No.: 10/789,947

(22) Filed: Feb. 27, 2004

(51) Int. Cl.
*H04N 7/12* (2006.01)
*H04N 11/02* (2006.01)
*H04N 11/04* (2006.01)

(52) U.S. Cl. .................. 375/240.16; 375/240.12; 375/240.13; 375/240.14; 375/240.15

(58) Field of Classification Search ................. 375/240.12–240.16
See application file for complete search history.

(56) References Cited

U.S. PATENT DOCUMENTS

| | | | |
|---|---|---|---|
| 5,557,341 A | 9/1996 | Weiss et al. | |
| 5,706,059 A | 1/1998 | Ran et al. | |
| 5,778,190 A | 7/1998 | Agarwal | |
| 5,784,175 A * | 7/1998 | Lee | 358/3.29 |
| 5,917,960 A * | 6/1999 | Sugawa | 382/278 |
| 5,940,145 A * | 8/1999 | Burl | 348/699 |
| 5,986,711 A * | 11/1999 | Pau | 375/240.18 |
| 5,995,080 A * | 11/1999 | Biro et al. | 345/603 |
| 6,011,596 A * | 1/2000 | Burl et al. | 348/699 |
| 6,057,892 A * | 5/2000 | Borer | 348/699 |
| 6,128,047 A | 10/2000 | Chang et al. | |
| 6,259,737 B1 | 7/2001 | Fung et al. | |
| 6,269,174 B1 | 7/2001 | Koba et al. | |
| 6,363,117 B1 | 3/2002 | Kok | |
| 6,414,997 B1 * | 7/2002 | Piccinelli et al. | 375/240.17 |
| 6,473,462 B1 * | 10/2002 | Chevance et al. | 375/240.16 |
| 6,542,547 B1 | 4/2003 | Wong | |
| 6,668,020 B2 | 12/2003 | Ma et al. | |
| 6,810,083 B2 * | 10/2004 | Chen et al. | 375/240.25 |
| 6,914,936 B1 * | 7/2005 | Tassa | 375/240.02 |
| 6,940,557 B2 * | 9/2005 | Handjojo et al. | 348/452 |
| 7,027,509 B2 * | 4/2006 | Jun et al. | 375/240.16 |
| 7,197,074 B2 * | 3/2007 | Biswas et al. | 375/240.16 |
| 2001/0021268 A1 * | 9/2001 | Jun et al. | 382/165 |
| 2002/0012396 A1 * | 1/2002 | Pau et al. | 375/240.16 |
| 2004/0202245 A1 * | 10/2004 | Murakami et al. | 375/240 |
| 2005/0157938 A1 * | 7/2005 | Kondo et al. | 382/254 |

OTHER PUBLICATIONS

Biwas, M., Nguyen, T., "A Novel Motion Estimation Algorithm Using Phase Plane Correlation for Frame Rate Conversion," IEEE Xplore, Release 2.1, Nov. 3-6, 2002, pp. 1-8.*

(Continued)

*Primary Examiner*—Marsha D Banks Harold
*Assistant Examiner*—Chikaodili E Anyikire
(74) *Attorney, Agent, or Firm*—Fenwick & West LLP

(57) ABSTRACT

Motion vectors for encoding a predicted frame relative to a reference frame are determined from a phase correlation of corresponding regions of the predicted frame and reference frame. Peaks in the phase correlation are identified, and the location of the peaks are used as candidate motion vectors. From this limited set of candidate motion vectors, the best motion vectors for predicting blocks within each region can be readily identified.

72 Claims, 5 Drawing Sheets

OTHER PUBLICATIONS

Aude, A.J., "A Tutorial in Coherent and Windowed Sampling with A/D Converters," Application Note AN9675, Intersil Corporation, Feb. 1997, pp. 1-8.*

Hill, L. et al., "Motion Measurement Using Shape Adaptive Phase Correlation," Electronics Letters, Dec. 6, 2001, 2 pages, vol. 37, No. 25.

Liang, Y., "Phase Correlation Motion Estimation," Final Project EE 392J, Stanford University, Winter Quarter 2000, pp. 1-9.

Thomas, G.A., "Television Motion Measurement for DATV and Other Applications," BBC Research Department Report, BBC RD 1987/11, Sep. 1987, 24 pages.

Biswas, M., and Nguyen, T.Q., *A Novel Motion Estimation Algorithm Using Phase Plane Correlation for Frame Rate Conversion*. Asilomar Conference on Signals, Systems and Computers, 2002.

Hill, L., and Vlachos, T., *Motion Measurement Using Shape Adaptive Phase Correlation*, Electronics Letters, vol. 37: No. 25, Dec. 6, 2001.

Lang, Y., *Phase-Correlation Motion Estimation*, Digital Video Processing (EE392J): Stanford University, Winter Quarter 2000.

Thomas, G.A., *Television Motion Measurement For DATV and Other Applications*, Research Department Engineering Division, Report No. 1987/11, British Broadcasting Corporation, Sep. 1987.

* cited by examiner

Table 1

| Motion vector # K = 10 | PC surface peak value | X coordinate of motion vector | Y coordinate of motion vector |
|---|---|---|---|
| 1 | 12102 | 4 | -10 |
| 2 | 449 | -1 | -1 |
| 3 | 416 | -3 | -1 |
| 4 | 416 | -2 | 5 |
| 5 | 399 | 3 | 1 |
| 6 | 319 | -10 | -15 |
| 7 | 318 | -4 | 14 |
| 8 | 305 | -5 | -1 |
| 9 | 298 | -13 | 7 |
| 10 | 296 | 10 | 8 |

PHASE CORRELATION BASED MOTION ESTIMATION IN HYBRID VIDEO COMPRESSION

FIELD OF INVENTION

This invention relates in general to video compression, and more particularly to motion estimation in video images.

BACKGROUND OF INVENTION

Motion Estimation (ME) and Compensation is an important technique to exploit the temporal correlations among successive frames in a video sequence. Almost all current video compression standards such as MPEG-1/2/4 and H.26x employ a hybrid of block-based motion compensated prediction and transform coding for representing variations in picture content due to moving objects. In block-based motion estimation, a current frame is divided into rectangular blocks and an attempt is made to match each current block with a block from a reference frame, which would serve as the predictor of the current block. The difference between this predictor block and the current block is then encoded and transmitted. The (x,y) offset of the current block from the predictor block is characterized as a motion vector. A significant improvement in compression efficiency is achieved since usually the 'difference block' has a much lower energy or information content than the original block.

The improvement in compression efficiency, however, comes at a significant increase in complexity, since the process of matching a current block with a predictor block almost always involves a search algorithm. The current block is searched for the best possible match in the reference frame within a search window located around the position of the block in the current frame. For each search location, some metric—typically the Sum of Absolute Differences (SAD), or the Sum of Squared Difference (SSD) between the pixels of the two blocks—is calculated. The block that produces the smallest value in the metric is then selected as the predictor block. A full search strategy typically involves testing all the available blocks in the search range leading to a high computational complexity. The complexity of the search algorithm thus depends on the size of the search area (amongst other things).

The algorithms aimed at simplifying the number of calculations for motion estimation can be classified as being pel-recursive, block-based or object based. The pel-recursive methods lead to a significant number of operations per frame, as calculations have to be done on every pixel. The object-based methods involve separate operations for object-recognition leading to computational complexity. It has been observed that the computational complexity could be reduced if efficient block-based search techniques could be designed.

Many attempts aimed at reducing the complexity of ME have focused on Fast Motion Estimation (FME) algorithms, which focus on ways to reduce the number of search candidates required to find a 'good match' while leading to a minimum degradation in the predicted video quality as compared to the exhaustive search. Several block-based motion estimation algorithms that are computationally faster than the full search have been investigated and developed. The three-step search (TSS), new three-step search (NTSS), four step-search (4SS), block-based gradient descent search (BBGDS), diamond search (DS), hexagon-based search (HEXBS), and Unsymmetrical-cross Multi-Hexagon-grid Search (UM-HexagonS) are a few such FME algorithms. In addition, various FME methods are also disclosed in U.S. Pat. Nos. 6,668,020, 6,542,547, 6,414,997, 6,363,117, 6,269,174, 6,259,737, 6,128,047, 5,778,190, 5,706,059, and 5,557,341. In general, these methods are carried out in the spatial domain and depend on the shape and size of the search pattern and on the efficient choice of the search center to increase the speed of the motion vector search. However, the disadvantage is that these techniques may fall into a local distortion minimum and not identify the best predictor block. Also, the reduction in the number of search points depends on the shape of the search pattern.

While FME algorithms can reduce the complexity of the ME process by a factor of 10 or better, they nonetheless suffer from the fact that—like the full search algorithm—their complexity is proportional to the size of the search area. For a highly complex encoder—such as the latest H.264/MPEG-4 AVC encoder—a factor of 10 or 20 improvement may still not be sufficient for real-time performance. There is therefore a need for an alternative mechanism that can perform motion estimation at much lower complexity, but without sacrificing compression efficiency.

SUMMARY OF THE INVENTION

A phase correlation based analysis is used to identify a number of candidate motion vectors for predicting macroblocks with a predicted frame. For a macroblock that is to be predicted, the candidate motion vectors are evaluated to determine which candidate results in the least distortion with respect to a reference frame. The phase correlation analysis is generally independent of the size of predicted frame or region thereof being analyzed, and thus readily scales to various sized images, without significantly increasing the time needed to encode the frames.

In one embodiment, a predicted frame and a reference frame are divided into phase correlation blocks, each of which includes a number of macroblocks. The size of the phase correlation blocks can be varied to tradeoff encoding speed and image quality, as well as to take advantage of the computational implementation of the phase analysis. A phase analysis between corresponding phase correlation blocks in the predicted frame and reference frame results in a phase correlation surface. The surface will have a number of peaks, each of which represents underlying motion between the two phase correlation blocks. A number of the most significant phase correlation peaks are selected. The motion vectors associated with these peaks are likewise determined, according to the location of the peaks on the phase correlation surface. To encode a macroblock within a phase correlation block, the candidate motion vectors are evaluated with respect to the macroblock to determine which candidate minimizes a distortion measure for the macroblock. This candidate is then selected for encoding the macroblock.

There are a number of various refinements of the above process, which can be used independently or in any combination. First, the phase correlation blocks can either be overlapping or non-overlapping. Second, a windowing function may be applied to the edges of the phase correlation blocks to smooth their pixel values, and reduce discontinuities between the blocks. Third, the number of candidate motion vectors can be fixed or variable. Where the number is variable, it can be selected based on the size of the frame, a variance of the phase correlation peaks, or other context dependent variables. Fourth, the evaluation of candidate motion vectors can be extended once a best candidate is selected to include an evaluation of subpixel nearby motion vectors. Fifth, the evaluation of candidate motion vectors can terminate before all of the candidates are evaluated, for example if a threshold distortion measure is reached; the threshold can be fixed or adaptive.

The present invention has various embodiments, including as a computer implemented process, as computer apparatuses, as integrated circuits, and as computer program products that execute on general or special purpose processors.

The figures depict various embodiments of the present invention for purposes of illustration only. One skilled in the art will readily recognize from the following discussion that alternative embodiments of the illustrated and described structures, methods, and functions may be employed without departing from the principles of the invention.

DETAILED DESCRIPTION

Figure 1:
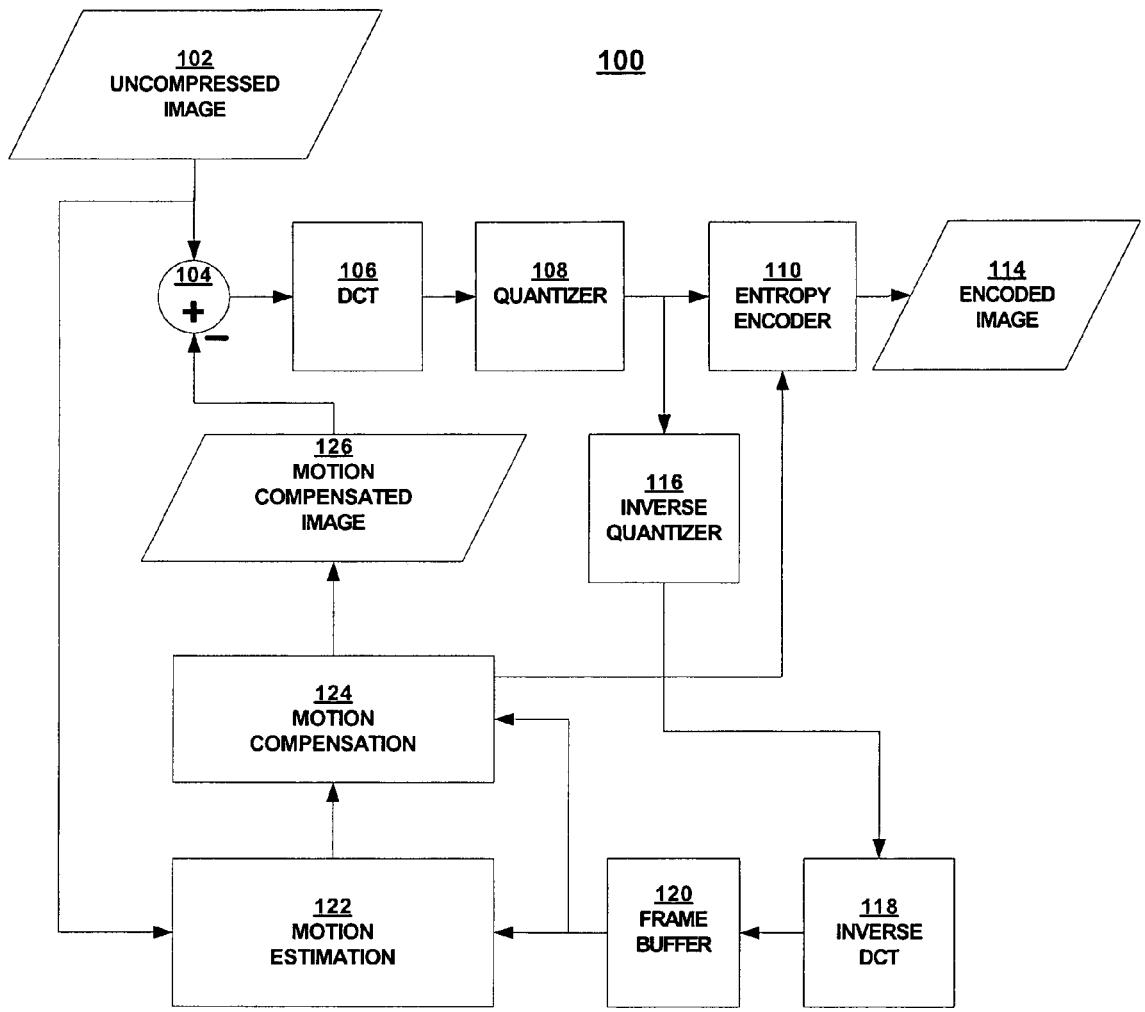
FIG. 1 is a block diagram of a hybrid encoder.

Referring now to FIG. 1, there is shown a block diagram of an encoder 100 according to one embodiment of the present invention. The encoder 100 generally operates according to principles of an MPEG-1 or MPEG-2 video encoder as described in ISO/IEC 11172 and ISO/IEC 13818 or similar hybrid Motion Compensation/DCT encoder, with the additional features and structures as further described below. The encoder 100 is used to encode a video sequence that comprises a plurality of uncompressed images 102. The image 102 data comprises a plurality of macroblocks, each macroblock having either 4:x:x sample format of luminance and chrominance data, depending on the implementation.

The type of image (equivalently "frame" or "picture" or "slice") will be one of an intra-picture (I), a forward predicted picture (P), or a bi-directional predicted (B) picture. Intra-pictures (I-pictures) are coded without reference to other pictures contained in the video sequence. In older video compression standards such as MPEG-1 and MPEG-2, Inter-frame predicted pictures (P-pictures) are coded with reference to the nearest previously coded I-picture or P-picture, usually incorporating motion compensation to increase coding efficiency. In H.264/MPEG-4 AVC, different blocks within a P-slice may refer to blocks in different, previously coded I-slice or P-slice. Bi-directionally predicted (B-pictures) may use both past and future frames as references. To achieve high compression, motion compensation can be employed based on the nearest past and future P-pictures or I-pictures.

The encoder 100 uses different encoding processes depending on the type of the image. P and B type frames are encoded as follows. The image macroblocks are input into both subtractor 104 and motion estimator 122. The motion estimator 122 determines for each macroblock a motion vector, using the phase correlation analysis as described below, where the motion vector represents the horizontal and vertical displacement from the current macroblock being encoded to the matching macroblock in the reference picture. When completed for all of the macroblocks in the current image, the result is a set of motion vectors corresponding to the macroblocks of the current image. Each macroblock will be also coded as either a forward predicted (P), backward predicted (B), weighted average predicted (W), intra (I), or skip (S) block, depending on the motion vector information for the block, if any, and the frame type. For a B frame, motion predicted blocks will be either P or B blocks, depending on the reference picture used for the particular macroblock; otherwise, the blocks will be I or S blocks. For a P frame, the blocks will be either P, S, or I blocks. These motion vectors data and block information are passed to the motion compensation stage 124, which applies them to the reference image(s) to create a motion compensated image 126.

The motion compensated image 126 is then subtracted from the original image 102 by subtractor 104 to produce a set of error prediction or residual signals for each macroblock (in practice this step takes place on macroblock by macroblock basis directly following motion estimation). This error prediction signal represents the difference between the predicted image and the original image 102 being encoded. In the case that the original image 102 is a B- or P-picture, the motion compensated image 126 is an estimation of the original image 102. In the case that the original image 102 is an I-picture, then the motion compensated image 126 will have all pixel values being equal to zero, and the quantized DCT coefficients represent transformed either pixel values or error prediction signal between the current block and a previously encoded block in the current frame. For I frames, the quantized coefficients are used to reconstruct the I frame as a reference image via inverse quantizer 100 and inverse DCT 118. The reconstructed image is stored in frame buffer 120.

The motion estimator 122 calculates the motion vector of each block using a phase correlation method that directly measures the motion of image content. Generally, the method uses phase correlation between blocks of the current frame and the reference frame to identify a limited number of the best motion vectors for predicting the macroblocks of the current frame. This limited number of candidate motion vectors is then evaluated with respect to each macroblock to be predicted to determine the best motion vector. A particular benefit of this method is that computational complexity is independent of the size of the search area, thereby allowing for scaling and coding quality to be variably controlled.

Figure 2:
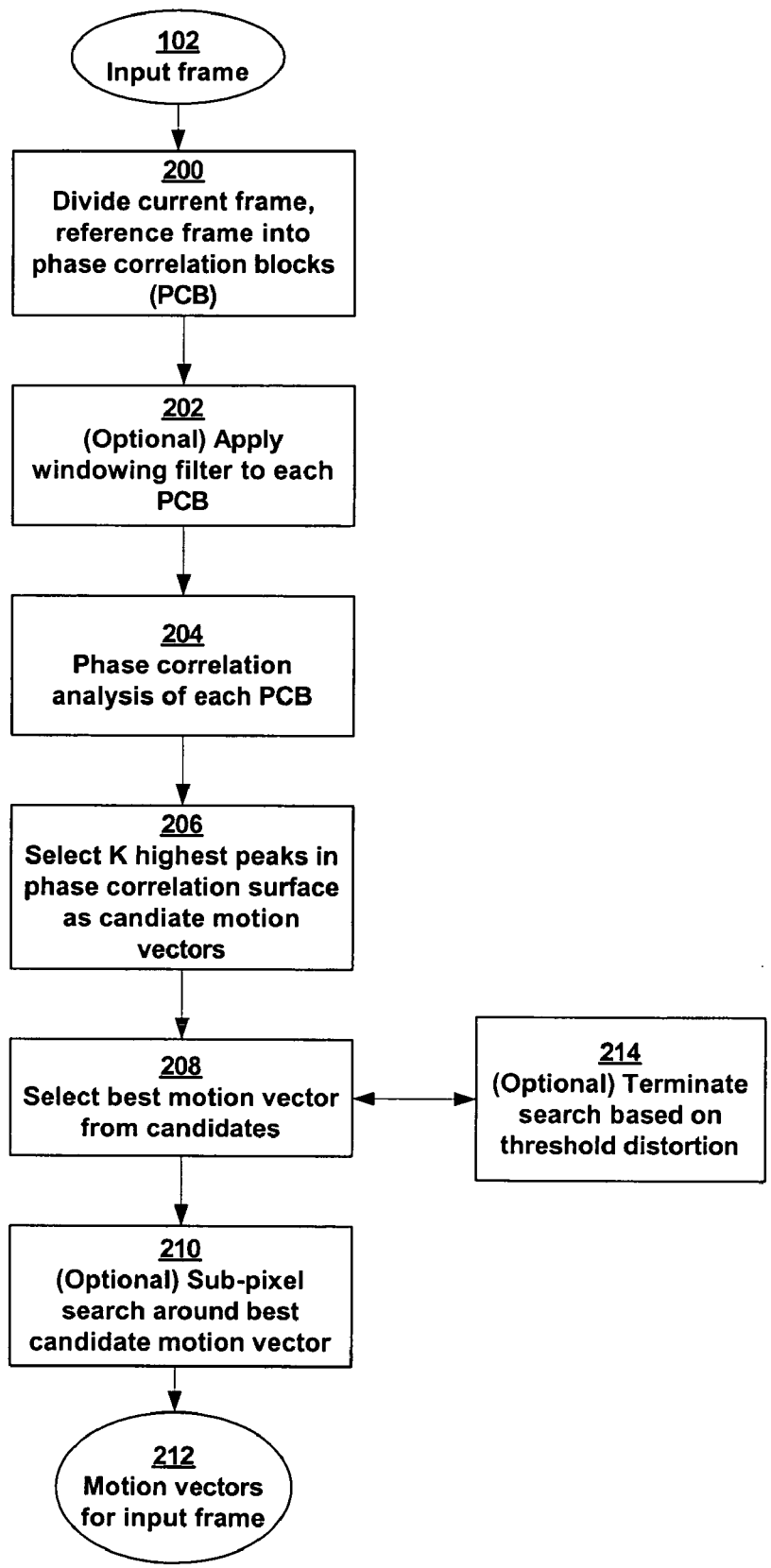
FIG. 2 is a flowchart of the motion estimation and motion compensation process.
Figure 3:
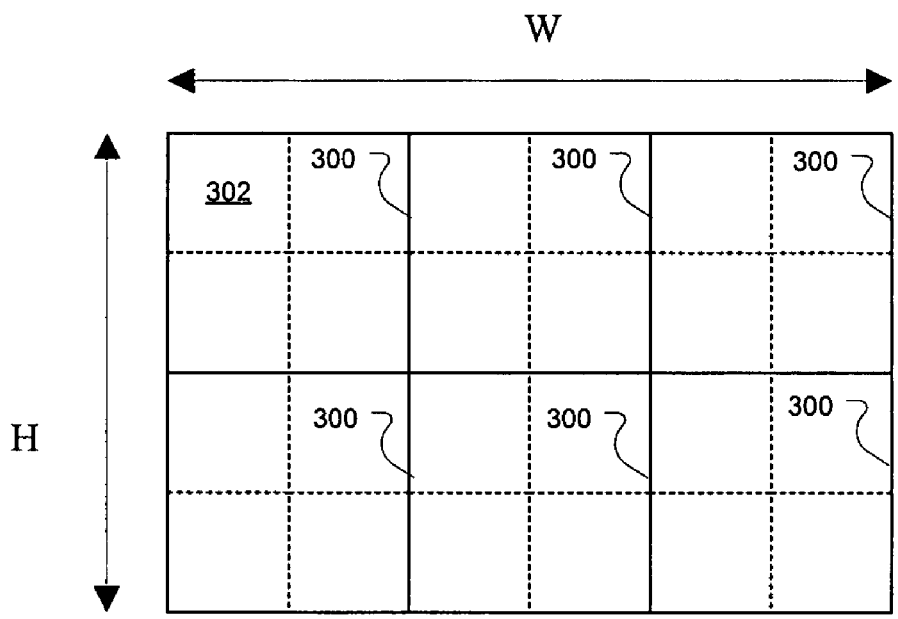
FIG. 3 illustrates a frame with non-overlapping phase correlation blocks.
Figure 4:
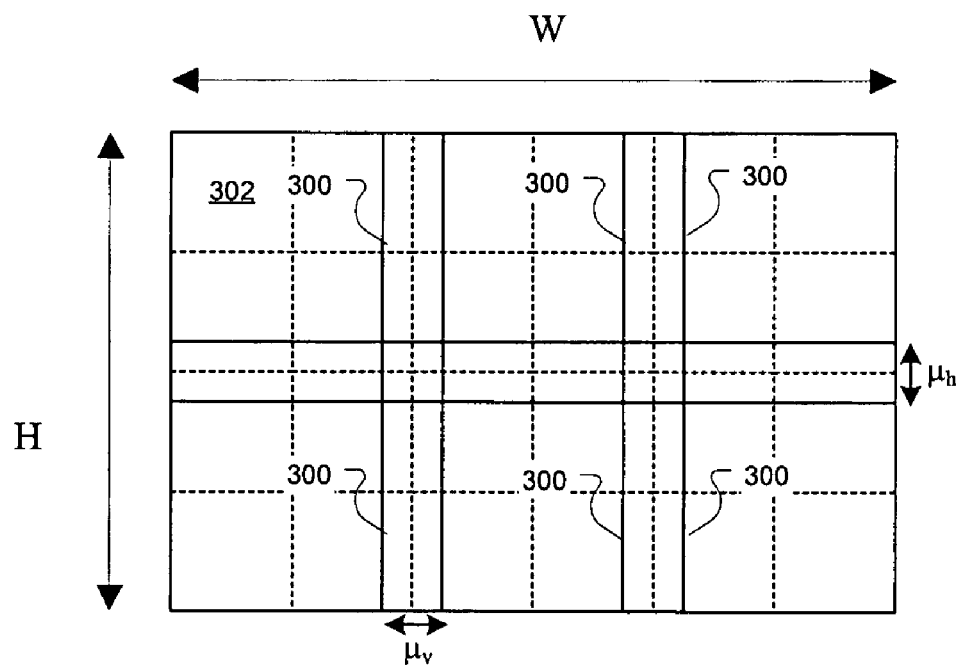
FIG. 4 illustrates a frame with overlapping phase correlation blocks.

Referring now to FIG. 2, there is shown a flowchart of the operation of the motion estimator 122 to perform the phase correlation-based motion estimation. The input to the motion estimator 122 is the uncompressed image 102 received from frame buffer 120. The motion estimator 122 divides 200 the reference frame R and the current frame P (equivalently, predicted frame) for which motion is to be estimated are divided into phase correlation blocks of size M×N, where M and N are a power of 2 in order to take advantage of existing FFT algorithms. Some hybrid encoders (e.g. those based on the H.263, MPEG-4 and H.264 standards) allow motion vectors to point outside of the boundaries of the frame (so called Unrestricted Motion Vector mode) to cater for objects that have partially moved outside of the frame. In such cases, the frames are extended on each border (through edge padding methods prescribed by the underlying standards) by the amount of the maximum motion vector allowed. If this option is enabled, then it is the 'extended frames' that are split into phase correlation blocks of size M×N. FIG. 3 illustrates an embodiment where the phase correlation blocks 300 are non-overlapping; each phase correlation block covers a number of macroblocks 302. FIG. 4 illustrates an embodiment where the phase correlation blocks 300 overlap, as further described below.

In one embodiment, the phase correlation block dimensions (M and N) are chosen to be the power of two greater than 2S+16, where S is the maximum magnitude of the motion vectors, and describes a maximum search range. The parameter S can be used as an encoding parameter, and is typically selected based on image resolution, source frame rate and desired trade-off between complexity and quality. Generally, increasing the value of S results in a higher quality image, since a larger extent of the reference frame can be searched to find a best matching block. The choice of M and N in this matter is beneficial in that it ensures that the phase correlation block is large enough to fully cover the entire search area for a macroblock of size 16×16 located at the center of the phase correlation block. (A macroblock of size 16×16 is the largest block size that is used for prediction in existing H.26× and MPEG-1/2/4 video compression standards.) If the maximum allowable search range in the horizontal direction is $S_h$, then $$M > 2S_h + 16 \quad (1)$$

Similarly $$N > 2S_v + 16 \quad (2)$$

where $S_u$ is the maximum search range in the vertical direction.

As an example, if $S_u = S_h = 32$, then the phase correlation block will be of size 128×128.

As an optional step, the motion estimator 122 applies 202 a windowing filter to each phase correlation block. The windowing filter process is further described below.

Next, the motion estimator 122 iterates over the co-located phase correlation blocks of the reference frame $R_{ij}$ and the current frame $P_{ij}$, where i is the number of columns of phase correlation blocks, and j is the number of rows of phase correlation blocks, and obtains 204 phase correlation values for each pair of phase correlation blocks. The phase correlation analysis is as follows.

Let $f_2$ (x, y) be a function that represents the phase correlation block in current frame P for which motion estimation is to be done and $f_1$ (x, y) be the function that represents the reference frame R. Assuming translation motion, $f_2$ (x, y) can be expressed as $$f_2(x,y) = f_1(x - x_0, y - y_0) \quad (3)$$

If $F_1$ (u,v) and $F_2$(u,v) are the Fourier Transforms (FT) of $f_1$(x,y) and $f_2$(x,y) respectively, a shift in the spatial domain is reflected as a phase shift in the frequency domain and can be written as:

$$F_2(u,v) = F_1(u,v) e^{(-i(ux_0 + vy_0))} \quad (4)$$

The product of the two FTs gives a measure of the phase correlation between the two frames. The normalized cross-power spectrum can be written as $$\frac{F_1(u,v) F_2^*(u,v)}{|F_1(u,v) F_2^*(u,v)|} = e^{(i(u x_0 + v y_0))} \quad (5)$$

The Inverse Fourier transform (IFT) of the normalized cross-power spectrum is then used to extract the motion vector $(x_0, y_0)$ from (5) since the resulting correlation surface has a unit impulse response centered at $(x_0, y_0)$.

$$F^{-1}\left[\frac{F_1(u,v) F_2^*(u,v)}{|F_1(u,v) F_2^*(u,v)|}\right] = \delta(x_0, y_0) \quad (6)$$

Thus, the motion estimator 122 performs an FFT on each of the phase correlation blocks $P_{ij}$ and $R_{ij}$, determines their normalized cross product, and takes the IFT of this value to determine a phase correlation surface. The motion estimator 122 then identifies 206 the location of the K highest peak(s) (i.e. those with the largest magnitude) in the phase correlation surface for the current phase correlation block. The locations of these peaks give K candidate motion vectors. Each motion vector is directed from the center of the phase correlation block to the (x,y) location of the peak.

Figure 5:
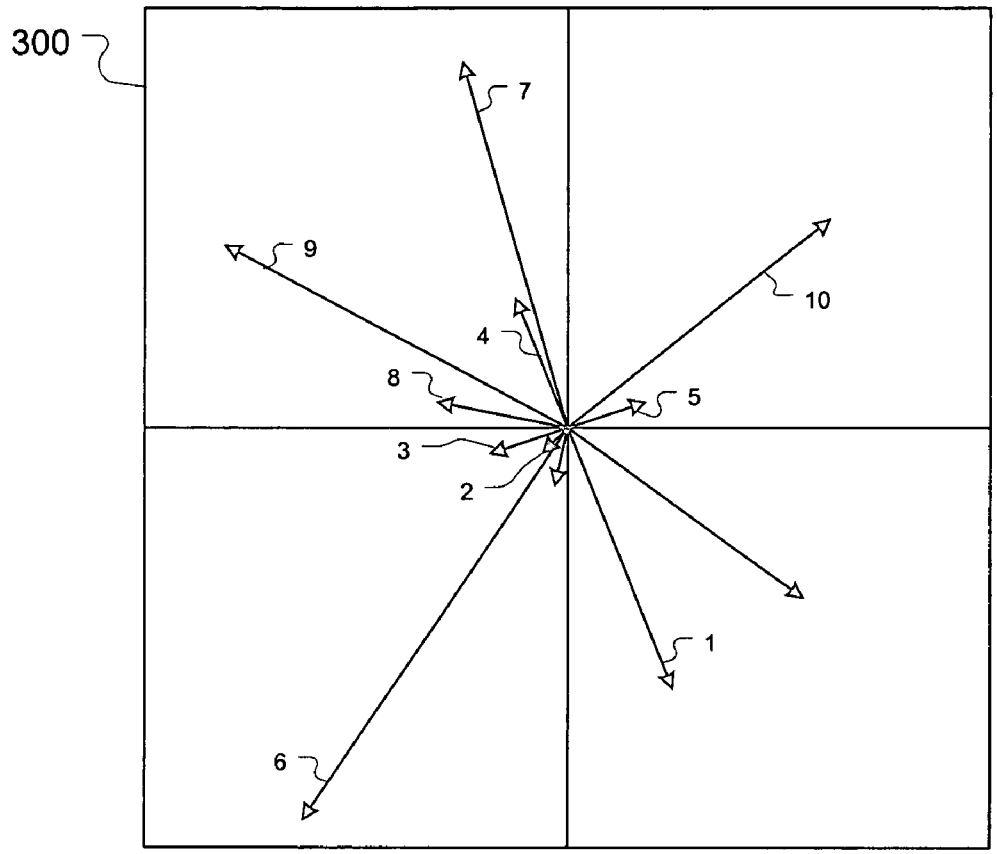
FIG. 5 illustrates motion vector candidates on a phase correlation surface.

If there is just a single, uniform motion and no object deformation, the IFT correlation plane has a single peak at $(x_0, y_0)$, corresponding to the single motion vector. If there are multiple motions with several objects, or objects undergo deformation, the plane of IFT shows several peaks each representing a component motion, as illustrated in the example FIG. 5, where K=10; Table 1 of FIG. 5 shows the K candidate motion vectors for this example, with their peak values, and their (x,y) values for their associated motion vectors. Thus, by locating the different peaks in the correlation surface, the motion vectors corresponding to different component motions in the frames are identified.

The number K may be adjusted to trade-off encoding speed and image quality. In different embodiments, K can be selected as 1) a fixed value (e.g. 10 or 16); 2) as a function of the size of the block to be predicted (the larger the size, the smaller the value of K); 3) based on the distribution of the peaks in the correlation surface (with the greater the variance in the values of the peaks, the smaller the value of K). This last case generally entails selecting a smaller number of candidates when there are a few very dominant peaks, and selecting more candidates if there are no peaks that are clearly dominant. Each of these alternatives can be used independently, or in any combination, as a weighted function.

In another embodiment, the motion estimator 122 performs motion estimation at sub-pixel resolution using the phase correlation approach, for half-pixel accuracy, for instance. In this embodiment, the phase correlation surface given in Eq. (6) is interpolated by a factor of two in each direction.

Referring again to FIG. 2, the motion estimator 122 uses the K candidate motion vectors for each predicted phase correlation $P_{ij}$ to identify 208 the best motion vector for each macroblock in the phase correlation block For each phase correlation block $P_{ij}$, the motion estimator 122 searches the K candidate motion vectors for each block (a block can be either a macroblock or sub-block) within the phase correlation block to select 208 the best motion vector. More particularly, for each block in the current phase correlation block the motion estimator 122 applies each of the K candidate motion vectors to the current block, offsetting the block's location onto a block of the reference frame. The motion estimator 122 determines a distortion measure (e.g., sum of absolute difference, SAD) between the current block of the current frame P relative to the predictor block of reference frame R. The candidate motion vector that minimizes distortion is chosen to be the best candidate to represent the motion between the two blocks. When the search is completed, the motion estimator 122 outputs the set 212 of motion vectors for the input frame to the motion compensation stage 124.

An as optional embodiment, once the motion estimator 122 identifies the best candidate out of the K candidates for a current block, it then performs a fractional motion search 210 around the selected candidate for sub-pixel accuracy. In one embodiment, the motion estimator 122 searches the eight neighboring half-pixel motion vectors. In another embodiment, a secondary subpixel search is done at the eight quarter-pixel motion vectors surrounding the best candidate at the end of the half-pixel search. Thus, even with both subpixel searches, the total number of motion vectors searched is limited to K+16, regardless of the size of the search area.

As another optional embodiment, a further reduction in the number of candidate vector evaluations can be obtained by early termination 214 of the motion vector evaluation if the distortion measure is less than a predefined or adaptive threshold value. If this condition is encountered, no more candidates need to be tested for further integer pel search and for half/quarter pixel search. Conditions for early termination may include 1) reaching a pre-determined, fixed distortion measure; 2) reaching a distortion measure threshold that is derived from the distortion measure of the previously encoded neighboring blocks. For instance, the threshold could be the minimum of the distortion measures of the three neighboring blocks or blocks that lie directly above, directly to the left and above-right (northeast) of the block to be encoded.

This phase correlation technique directly measures the magnitude and direction of motion vectors rather than estimating them using block-matching searches. As such, the complexity of performing phase correlation is essentially independent of the motion search area. The number of candidate motion vectors that need to be tested does not vary with the change in the motion search window size. Hence there is no addition in complexity by increasing the search window, which is of primary importance for high quality encoding of higher resolution sequences.

Another benefit of the phase correlation method is that it is also insensitive to variations in intensity due to the normalization step (Eq. 5) leading to a whitening of signals. This implies that phase correlation gives a true measure of the movement of objects between two frames. Due to this property it is possible that the motion vectors for neighboring blocks might be more uniform than would be the case for FME algorithms based on the shape of the search pattern. This property makes it more suitable for rate distortion optimization.

As indicated above, in one embodiment, the phase correlation blocks are non-overlapping. Phase correlation depends on identifying the relative motion between objects so naturally its performance would be significantly better if the entire object is encompassed within the phase correlation block in both frames. Since this cannot be guaranteed in video sequences, in one embodiment, the phase correlation blocks are allowed to have a minimum overlap value of $\mu_h$ and $\mu_u$ pixels in the horizontal and vertical directions, respectively, $\mu_h \geq S_h$ and $\mu_u \geq S_u$. This ensures that if any object moves from one phase correlation block to another, then the motion vectors from at least one of the overlapping phase correlation blocks would provide a good match. In this embodiment, for those blocks that partly lie in more than one phase correlation block, the motion estimator 122 tests 208 the K candidate motion vectors from all the phase correlation blocks in which the block is partly located in order to select the best motion vector.

The $\mu_h$ and $\mu_u$ pixel overlap minimums also ensures that objects that are up to $S_h \times S_u$ pixels large are guaranteed to completely fall into one or another phase correlation block. A much larger overlap would result in there being more phase correlation blocks, thereby resulting in a higher complexity. The amount of overlap can thus be viewed as yet another parameter for trading off complexity for compression efficiency.

In one embodiment, the amount of overlap is selected in such a manner that the phase correlation blocks are evenly distributed across the frame. Referring to FIG. 4, given a frame of size W×H (where the frame could be either the actual frame or the extended frame), and given phase correlation blocks 300 of size M×N, and given an overlap of $\mu_h$ in the horizontal direction between two adjacent phase correlation blocks, results in the following relationship:

$$W = M + (i-1)(M-\mu) \tag{7}$$

where i is an integer number of phase correlation blocks in one row. A minimum $\mu_h$ pixel overlap in the horizontal dimension implies that $\mu_h \geq S_h$. Replacing this value in Eq. (7) and solving for i yields:

$$i \geq \frac{(W-M)}{M-S_h} + 1 \tag{8}$$

This implies that i is the smallest integer that satisfies the inequality above. Once i is obtained, the amount of overlap $\mu_h$ can be deduced from Eq. (1) by solving for $S_h$:

$$\mu_h = M - \frac{W-M}{i-1} \tag{9}$$

Using the same process j, the number of phase correlation blocks in one column can be derived, and therefore $\mu_v$, the amount of overlap in the vertical direction:

$$j \geq \frac{(H-N)}{N-S_v} + 1 \tag{10}$$

$$\mu_v = N - \frac{H-N}{j-1} \tag{11}$$

Figure 6:
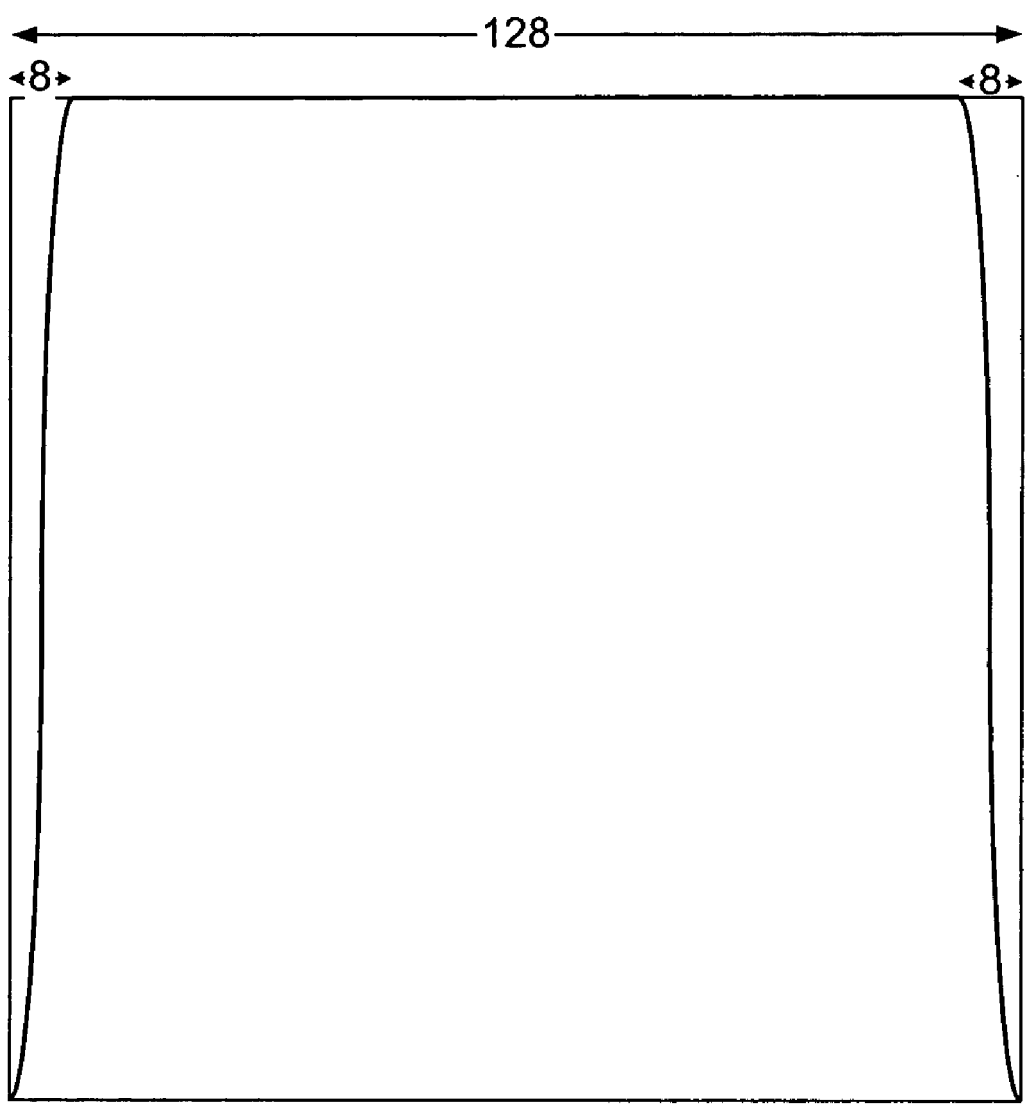
FIG. 6 illustrates an example of an extended 1D cosine bell window.

As indicated above, an optional process in the phase correlation analysis is the application 202 of a windowing filter to the phase correlation blocks. The rectangular shape of the phase correlation blocks creates a sharp signal discontinuity at the edges of these blocks. This discontinuity produces extra high-frequency components in the FFT spectrum domain, potentially leading to false peaks in the phase correlation surface. In one embodiment, these spurious peaks are reduced by smoothing out the pixel values at the edges of the phase correlation blocks using a windowing filter. This may be done, for example, by applying a suitable 2D windowing function to scale down the pixel values at the edges of each phase correlation block. In one embodiment a modified, 2-D version of the 1D extended cosine bell window is used. FIG. 6 illustrates a 1D modified extended cosine bell window. Preferably, the transition regions of the cosine bell are set to be equal to $1/16$ of phase correlation block size; this leaves the middle $7/8^{ths}$ of the phase correlation block scaled at 100%. Pixels within each transition region are scaled by the corresponding curve value. For example, for a phase correlation block where M=N=128, the transition region T equals 128/16=8 pixels. The 2D cosine bell applies the 1D version in both the horizontal and vertical directions, with the resulting scale value being the product of the individual curve scale values. Assuming that windowing has been used amount of the overlap from Eqs. (9) and (11) may be increased by the amount of T. Equations (12) and (13) define the 1-D and 2-D versions of the windowing filter for one embodiment:

Modified 1D Extended Cosine Bell Window W(n) of Phase Correlation Block of size N:

$$W(n) = \begin{cases} \frac{1}{2}\left[1 - \cos\left(\frac{16*n*\Pi}{N}\right)\right]\ldots \text{ for }\left(\frac{N}{16} \leq n\ldots \text{ or }\ldots n \geq \frac{15*N}{16}\right) \\ 1 \ldots \text{ otherwise} \end{cases} \quad (12)$$

Modified 2D Extended Cosine Bell Window W(m,n) of Phase Correlation Block of size M×N:

$$W(m, n) = \begin{cases} \left(\frac{1}{2}\left[1 - \cos\left(\frac{16*m*\Pi}{M}\right)\right] * \frac{1}{2}\left[1 - \cos\left(\frac{16*n*\Pi}{N}\right)\right]\right) \\ \text{for }\left(\frac{M}{16} \leq m \ldots \text{ or }\ldots m \geq \frac{15*M}{16}\right) \text{ and} \\ \left(\frac{N}{16} \leq n \ldots \text{ or }\ldots n \geq \frac{15*N}{16}\right) \\ 1 \ldots \text{ otherwise} \end{cases} \quad (13)$$

In summary then, the present invention provides a way of determining the best motion vector for predicting each block in current frame by using the phase correlation information between blocks of the reference frame and the current frame. Rather then iteratively comparing blocks directly as in conventional methods, a motion estimation process in accordance with the present invention can first accurately select a set of potential motion vector candidates using phase correlation information. From this reduced set of candidates, a best motion vector can be readily identified.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "calculating" or "determining" or "identifying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus. Those of skill in the art of integrated circuit design and video codecs appreciate that the invention can be readily fabricated in various types of integrated circuits based on the above functional and structural descriptions, including application specific integrated circuits (ASIC). In addition, the present invention may be incorporated into various types of video coding devices.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

The invention claimed is:

1. A computer readable storage medium encoded with computer executable instructions for controlling a processor to perform a computer implemented method of determining a motion vector for encoding a block of a predicted video frame with respect to a reference video frame, the method comprising:

establishing a size for phase correlation blocks, the size of the phase correlation blocks being larger than the maximum allowable magnitude of the motion vector;

identifying a number of highest phase correlation peaks within an inner area of a phase correlation surface, the phase correlation surface based upon a phase correlation block of the predicted video frame and a corresponding phase correlation block of the reference video frame, the inner area having a size equal to or less than the maximum allowable magnitude of a motion vector;

determining for each phase correlation peak identified in the inner area, a motion vector; and selecting from the determined motion vectors, a motion vector that has the minimum distortion measure between the block and a reference block offset from the block by the motion vector among the determined motion vectors.

2. The computer implemented method of claim 1, wherein identifying at least one highest phase correlation peak within an inner area of a phase correlation surface, the phrase correlation surface based upon a phase correlation block of the predicted video frame and a corresponding phase correlation block of the reference video frame, comprises:

applying a Fourier transform to a phase correlation block of predicted video frame and a corresponding phase correlation block of the reference video frame;

determining a normalized cross product of the Fourier transforms;

determining an inverse Fourier transform to obtain the phase correlation surface; and determining at least one peak on phase correlation surface.

3. The computer implemented method of claim 1, wherein identifying at least one highest phase correlation peak, comprises:

determining for each peak a motion vector; and selecting from the determined motion vectors, a motion vector that has the minimum distortion measure between the block and a block of the reference video frame offset from the block by the motion vector among the determined motion vectors.

4. The computer implemented method of claim 1, wherein selecting a motion vector, comprises:

applying each of the motion vectors to the block to obtain the reference block in the reference video frame; and selecting the motion vector that has the minimum distortion measure between the block and the reference block among the determined motion vectors.

5. The computer implemented method of claim 1, wherein each phase correlation block has horizontal and vertical dimensions that are a function of a maximum magnitude of the motion vectors.

6. The computer implemented method of claim 5, wherein the horizontal and vertical dimensions M and N, are each a power of 2 greater than 2S+16, where S is the maximum magnitude of the motion vectors in the horizontal and vertical direction, respectively.

7. The computer implemented method of claim 1, further comprising:

applying to the phase correlation block of the predicted video frame a windowing function prior to determining the at least one phase correlation peak.

8. The computer implemented method of claim 7, wherein the windowing function reduces discontinuity between adjacent phase correlation blocks.

9. The computer implemented method of claim 7, wherein the windowing function is a smoothing function at the edges of the phase correlation block.

10. The computer implemented method of claim 7, wherein the windowing function is an extended 2D cosine bell function.

11. The computer implemented method of claim 10, wherein the windowing function is:

$$W(m, n) = \begin{cases} \frac{1}{2}\left[1 - \cos\left(\frac{16*m*\Pi}{M}\right)\right] * \frac{1}{2}\left[1 - \cos\left(\frac{16*n*\Pi}{N}\right)\right] \ldots \text{ for } \left(\frac{M}{16} \leq m \ldots \text{ or } \ldots m \geq \frac{15*M}{16}\right) \text{ and } \left(\frac{N}{16} \leq \ldots \text{ or } \ldots n \geq \frac{15*N}{16}\right) \\ 1 \ldots \text{ otherwise} \end{cases}$$

where M is a width of a phase correlation block and N is a height of a phase correlation block.

12. The computer implemented method of claim 1, wherein phase correlation blocks of the predicted video frame are non-overlapping.

13. The computer implemented method of claim 1, wherein phase correlation blocks of the predicted video frame are overlapping.

14. The computer implemented method of claim 13, wherein the phase correlation blocks overlap by a minimum overlap value, where the minimum overlap value is greater than or equal to a maximum magnitude of the motion vectors.

15. The computer implemented method of claim 13, wherein selecting from the motion vectors comprises selecting from the motion vectors associated with all phase correlation blocks that include the block.

16. The computer implemented method of claim 1, wherein identifying a number of highest phase correlation peaks comprises:

determining a fixed number of correlation peaks.

17. The computer implemented method of claim 1, wherein identifying at least one highest phase correlation peak comprises interpolating subpixel peak values from the phase correlation peaks at pixel locations in the phase correlation block.

18. The computer implemented method of claim 1, wherein selecting a motion vector comprises:

selecting a first motion vector which reduces the distortion measure below a threshold value.

19. The computer implemented method of claim 18, wherein the threshold is a fixed distortion threshold.

20. The computer implemented method of claim 18, wherein the threshold is an adaptive distortion threshold.

21. The computer implemented method of claim 20, wherein the adaptive distortion threshold is a minimum distortion measure of a plurality of neighboring blocks.

22. A method of determining motion vectors for encoding a predicted video frame with respect to a reference video frame, the method comprising:

determining a phase correlation between the predicted video frame and the reference video frame, wherein the phase correlation produces a phase correlation surface including a number of highest phase correlation peaks within an inner area of the phase correlation surface, the number of phase correlation peaks determined as a function of a size of a phase correlation block of the frame to be predicted, the inner area having a size equal to or less than the maximum allowable magnitude of a motion vector; and determining the motion vectors for encoding the predicted video frame from motion vectors defined by locations of the phase correlation peaks on the phase correlation surface.

23. A computer readable storage medium encoded with computer executable instructions for controlling a processor to perform a computer implemented method of determining motion vectors for encoding blocks of video frames, the video frames including a predicted frame with respect to a reference frame, the method comprising:

establishing a size for phase correlation blocks, the size for the phase correlation blocks being larger than the maximum allowable magnitude of the motion vector;

dividing the predicted frame and the reference frame into a plurality of phase correlation blocks, each phase correlation block including a number of blocks;

for each phase correlation block in the predicted frame,
  identifying a number of highest phase correlation peaks within an inner area of a phase correlation surface, the phase correlation surface based upon the phase correlation block and a corresponding phase correlation block of the reference frame, the inner area having a size equal to or less than the maximum allowable magnitude of a motion vector, and
  for each phase correlation peak identified in the inner area, determining an associated motion vector; and for each phase correlation block in the predicted frame, and for each block to be predicted in the phase correlation block, selecting from the determined motion vectors associated with the phase correlation block, a motion vector that has the minimum distortion measure between the block and a reference block in the reference frame offset from the block by the motion vector among the determined motion vectors.

24. An apparatus for determining a motion vector for encoding video frames, the video frames including a predicted frame and a reference frame, the apparatus comprising:
  a motion estimator circuit adapted to identify, a number of highest phase correlation peaks within an inner area of a phase correlation surface, the phase correlation surface based upon the phase correlation block of the predicted frame and a corresponding phase correlation block of the reference frame, the inner area having a size equal to or less than the maximum allowable magnitude of a motion vector, the size of the phase correlation block being larger than the maximum allowable magnitude of the motion vector, determine a motion vector for each phase correlation peak identified in the inner area, and select from the determined motion vectors, a motion vector that has the minimum distortion measure between the block and a reference block offset from the block by the motion vector among the determined motion vectors.

25. The apparatus of claim 24, wherein the motion estimator circuit is further adapted to apply a Fourier transform to a phase correlation block of predicted frame and a corresponding phase correlation block of the reference frame, determine a normalized cross product of the Fourier transforms, and apply an inverse Fourier transform circuit to obtain the phase correlation surface.

26. The apparatus of claim 24, wherein the motion estimator circuit is further adapted to determine for each peak a motion vector, and select from the determined motion vectors, a motion vector that has the minimum-distortion measure between the block and a block of the reference frame offset from the block by the motion vector among the determined motion vectors.

27. The apparatus of claim 24, wherein the motion estimator circuit is further adapted to apply each of the motion vectors to the block to obtain the reference block in the reference frame, and select the motion vector that has the minimum distortion measure between the block and the reference block among the determined motion vectors.

28. The apparatus of claim 24, wherein each phase correlation block has horizontal and vertical dimensions that are a function of a maximum magnitude of the motion.

29. The apparatus of claim 28, wherein the horizontal and vertical dimensions M and N, are each a power of 2 greater than 2S+16, where S is the maximum magnitude of the motion vectors in the horizontal and vertical direction, respectively.

30. The apparatus of claim 24, wherein the motion estimator circuit is further adapted to apply to the phase correlation block of the predicted frame a windowing function prior to determining the phase correlation peaks.

31. The apparatus of claim 30, wherein the windowing function reduces discontinuity between adjacent phase correlation blocks.

32. The apparatus of claim 30, wherein the windowing function is a smoothing function at the edges of the phase correlation block.

33. The apparatus of claim 30, wherein the windowing function is an extended 2D cosine bell function.

34. The apparatus of claim 30, wherein the windowing function is:

$$W(m, n) = \begin{cases} \frac{1}{2}\left[1 - \cos\left(\frac{16*m*\Pi}{M}\right)\right] * \frac{1}{2}\left[1 - \cos\left(\frac{16*n*\Pi}{N}\right)\right] & \text{for } \left(\frac{M}{16} \leq m \ldots \text{or} \ldots m \geq \frac{15*M}{16}\right) \text{ and } \left(\frac{N}{16} \leq n \ldots \text{or} \ldots n \geq \frac{15*N}{16}\right) \\ 1 & \ldots \text{otherwise} \end{cases}$$

where M is a width of a phase correlation block and N is a height of a phase correlation block.

35. The apparatus of claim 24, wherein phase correlation blocks of the predicted frame are non-overlapping.

36. The apparatus of claim 24, wherein phase correlation blocks of the predicted frame are overlapping.

37. The apparatus of claim 24, wherein the phase correlation blocks overlap by a minimum overlap value, where the minimum overlap value is greater than or equal to a maximum magnitude of the motion vectors.

38. The apparatus of claim 24, wherein the motion estimator circuit is further adapted to select a motion vector from the motion vectors associated with all phase correlation blocks that include the block.

39. The apparatus of claim 24, wherein the motion estimator circuit is further adapted to determine a fixed number of correlation peaks.

40. The apparatus of claim 27, wherein the motion estimator circuit is further adapted to determine a variable number of correlation peaks.

41. The apparatus of claim 24, wherein the motion estimator circuit is further adapted to determine a number of correlation peaks as a function of a size of the block.

42. The apparatus of claim 24, wherein the motion estimator circuit is further adapted to determine a number of correlation peaks as a function of a variance of the values of the phase correlation peaks.

43. The apparatus of claim 24, wherein the motion estimator circuit is further adapted to interpolate subpixel peak values from the phase correlation peaks at pixel locations in the phase correlation block.

44. The apparatus of claim 24, wherein the motion estimator circuit is further adapted to determine a plurality of subpixel motion vectors near the selected motion vector, and select one of the plurality of subpixel motion vectors.

45. The apparatus of claim 24, wherein the motion estimator circuit is further adapted to select a first motion vector which reduces the distortion measure below a threshold value.

46. The apparatus of claim 45, wherein the threshold is a fixed distortion threshold.

47. The apparatus of claim 45, wherein the threshold is an adaptive distortion threshold.

48. The apparatus of claim 47, wherein the adaptive distortion threshold is a minimum distortion measure of a plurality of neighboring blocks.

49. An apparatus for determining a motion vector for encoding video frames, the video frames including a predicted frame and a reference frame, the apparatus comprising:
    circuit means for identifying, a number of highest phase correlation peaks within an inner area of a phase correlation surface, the phase correlation surface based upon the phase correlation block of the predicted frame and a corresponding phase correlation block of the reference frame, the inner area having a size equal to or less than the maximum allowable magnitude of a motion vector, the size of the phase correlation block being larger than the maximum allowable magnitude of the motion vector, determining a motion vector for each phase correlation peak identified in the inner area, and selecting from the determined motion vectors, a motion vector that has the minimum distortion measure between the block and a reference block offset from the block by the motion vector among the determined motion vectors.

50. A computer readable storage medium encoded with computer executable instructions for controlling a processor to perform a computer implemented method of determining a motion vector for encoding a block of a predicted video frame with respect to a reference video frame, the method comprising:
    identifying a number of highest phase correlation peaks within an inner area of a phase correlation surface, the phase correlation surface based upon the phase correlation block of the predicted video frame and a corresponding phase correlation block of the reference video frame, the size of the phase correlation block being larger than a maximum allowable magnitude of the motion vector, and the inner area of the phase correlation surface having a size equal to or less than the maximum allowable magnitude of a motion vector;
    determining for each phase correlation peak identified in the inner area, a motion vector; and
    selecting from the determined motion vectors, a motion vector that has the minimum distortion measure between the block and a reference block offset from the block by the motion vector among the determined motion vectors.

51. A computer readable storage medium encoded with computer executable instructions for controlling a processor to perform a computer implemented method of determining a motion vector for encoding a block of a predicted video frame with respect to a reference video frame, the method comprising:
    identifying a number of highest phase correlation peaks within an inner area of a phase correlation surface, the phase correlation surface based upon the phase correlation block of the predicted video frame and a corresponding phase correlation block of the reference video frame, the size of the phase correlation block being larger than the maximum allowable magnitude of the motion vector, and the inner area of the phase correlation surface having a size equal to or less than the maximum allowable magnitude of a motion vector;
    determining for each phase correlation peak identified in the inner area, a motion vector;
    determining for each motion vector, a plurality of subpixel motion vectors near the motion vector; and
    for each motion vector, selecting one of the plurality of subpixel motion vectors that has the minimum distortion measure between the block and a reference block offset from the block by the motion vector among the determined plurality of subpixel motion vectors.

52. A computer readable storage medium encoded with computer executable instructions for controlling a processor to perform a computer implemented method of determining a motion vector for encoding a block of a predicted video frame with respect to a reference video frame, the method comprising:
    determining maximum allowable dimensions of a motion vector for encoding the block;
    establishing a phase correlation block having dimensions being larger than the maximum allowable dimensions of the motion vector;
    determining a search area within a phrase correlation surface, the phase correlation surface based upon the phase correlation block of the predicted video frame and a corresponding phase correlation block of the reference video frame, the search area having dimensions smaller than the dimensions of the phase correlation block;
    identifying a plurality of phase correlation peaks within the search area of the phase correlation surface;
    determining a respective motion vector for each identified peak correlation peaks within the search area of the phase correlation block; and
    selecting from the determined motion vectors, a motion vector that has the minimum distortion measure between the block and a reference block offset from the block by the motion vector among the determined motion vectors.

53. A computer readable storage medium encoded with computer executable instructions for controlling a processor to perform a computer implemented method of determining a motion vector for encoding a block of a predicted video frame with respect to a reference video frame, the method comprising:
    determining maximum allowable dimensions of a motion vector for encoding a block;
    establishing a phase correlation block having dimensions being larger than the maximum allowable dimensions of the motion vector;
    determining a search area within a phase correlation surface, the phase correlation surface based upon the phase correlation block of the predicted video frame and a corresponding phase correlation block of the reference video frame, the search area having dimensions smaller than the dimensions of the phase correlation block;
    identifying a plurality of phase correlation peaks within the search area of the phase correlation surface;

discarding those identified peak correlation peaks outside of the search area of the phase correlation block; and determining a respective motion vector for each of the remaining identified peak correlation peaks; and selecting from the determined motion vectors, a motion vector that has the minimum distortion measure between the block and a reference block offset from the block by the motion vector among the determined motion vectors.

54. A computer readable storage medium encoded with computer executable instructions for controlling a processor to perform a computer implemented method of determining a motion vector for encoding a block of a predicted video frame with respect to a reference video frame, the method comprising:

establishing an inner area within a phase correlation surface, the phase correlation surface based upon a phase correlation block of the predicted video frame and a corresponding phase correlation block of the reference video frame, the inner area smaller than the phase correlation block;

identifying a number of highest phase correlation peaks within the inner area of the phase correlation surface;

determining a respective motion vector for each of the identified peak correlation peaks; and selecting from the determined motion vectors, a motion vector that has the minimum distortion measure between the block and a reference block offset from the block by the motion vector among the determined motion vectors.

55. The computer implemented method of claim 1, wherein the maximum allowable magnitude of the motion vector is based on an encoding parameter for controlling image quality.

56. The computer implemented method of claim 1, wherein the number of the identified phase correlation peaks increases as the size of the phase correlation block increases.

57. The computer implemented method of claim 1, wherein the inner area of the phase correlation block is centrally positioned within the phase correlation block.

58. The computer implemented method of claim 23, wherein the maximum allowable magnitude of the motion vector is based on an encoding parameter for controlling image quality.

59. The computer implemented method of claim 23, wherein the number of the identified phase correlation peaks increases as the size of the phase correlation block increases.

60. The computer implemented method of claim 23, wherein the inner area of the phase correlation block is centrally positioned within the phase correlation block.

61. The apparatus of claim 24, wherein the maximum allowable magnitude of the motion vector is based on an encoding parameter for controlling image quality.

62. The apparatus of claim 24, wherein the number of the identified phase correlation peaks increases as the size of the phase correlation block increases.

63. The apparatus of claim 24, wherein the inner area of the phase correlation block is centrally positioned within the phase correlation block.

64. The apparatus of claim 49, wherein the maximum allowable magnitude of the motion vector is based on an encoding parameter for controlling image quality.

65. The apparatus of claim 49, wherein the number of the identified phase correlation peaks increases as the size of the phase correlation block increases.

66. The apparatus of claim 49, wherein the inner area of the phase correlation block is centrally positioned within the phase correlation block.

67. The computer implemented method of claim 50, wherein the maximum allowable magnitude of the motion vector is based on an encoding parameter for controlling image quality.

68. The computer implemented method of claim 50, wherein the number of the identified phase correlation peaks increases as the size of the phase correlation block increases.

69. The computer implemented method of claim 50, wherein the inner area of the phase correlation block is centrally positioned within the phase correlation block.

70. The computer implemented method of claim 51, wherein the maximum allowable magnitude of the motion vector is based on an encoding parameter for controlling image quality.

71. The computer implemented method of claim 51, wherein the number of the identified phase correlation peaks increases as the size of the phase correlation block increases.

72. The computer implemented method of claim 51, wherein the inner area of the phase correlation block is centrally positioned within the phase correlation block.

* * * * *

UNITED STATES PATENT AND TRADEMARK OFFICE
CERTIFICATE OF CORRECTION

PATENT NO. : 7,751,482 B1
APPLICATION NO. : 10/789947
DATED : July 6, 2010
INVENTOR(S) : Deepika Srinivasan et al.

It is certified that error appears in the above-identified patent and that said Letters Patent is hereby corrected as shown below:

Claim 2, column 11, line 19, replace "the phrase correlation" with --the phase correlation--.

Claim 11, column 12, lines 10-16, replace the existing equation with the equation below:

$$W(m,n) = \begin{cases} \frac{1}{2}\left[1-\cos\left(\frac{16*m*\Pi}{M}\right)\right] * \frac{1}{2}\left[1-\cos\left(\frac{16*n*\Pi}{N}\right)\right] \ldots for\left(\frac{M}{16} \leq m \ldots or \ldots m \geq \frac{15*M}{16}\right) and \left(\frac{N}{16} \leq n \ldots or \ldots n \geq \frac{15*N}{16}\right) \\ 1 \ldots otherwise \end{cases}$$

Claim 40, column 14, line 62, delete "27" and insert --28--.

Claim 52, column 16, line 34, replace "a phrase correlation" with --a phase correlation--.

Signed and Sealed this

Thirtieth Day of November, 2010

David J. Kappos
*Director of the United States Patent and Trademark Office*